JOSEPH S. GRAVES.
Improvement in Carriage Wheels.
No. 119,841.          Patented Oct. 10, 1871.
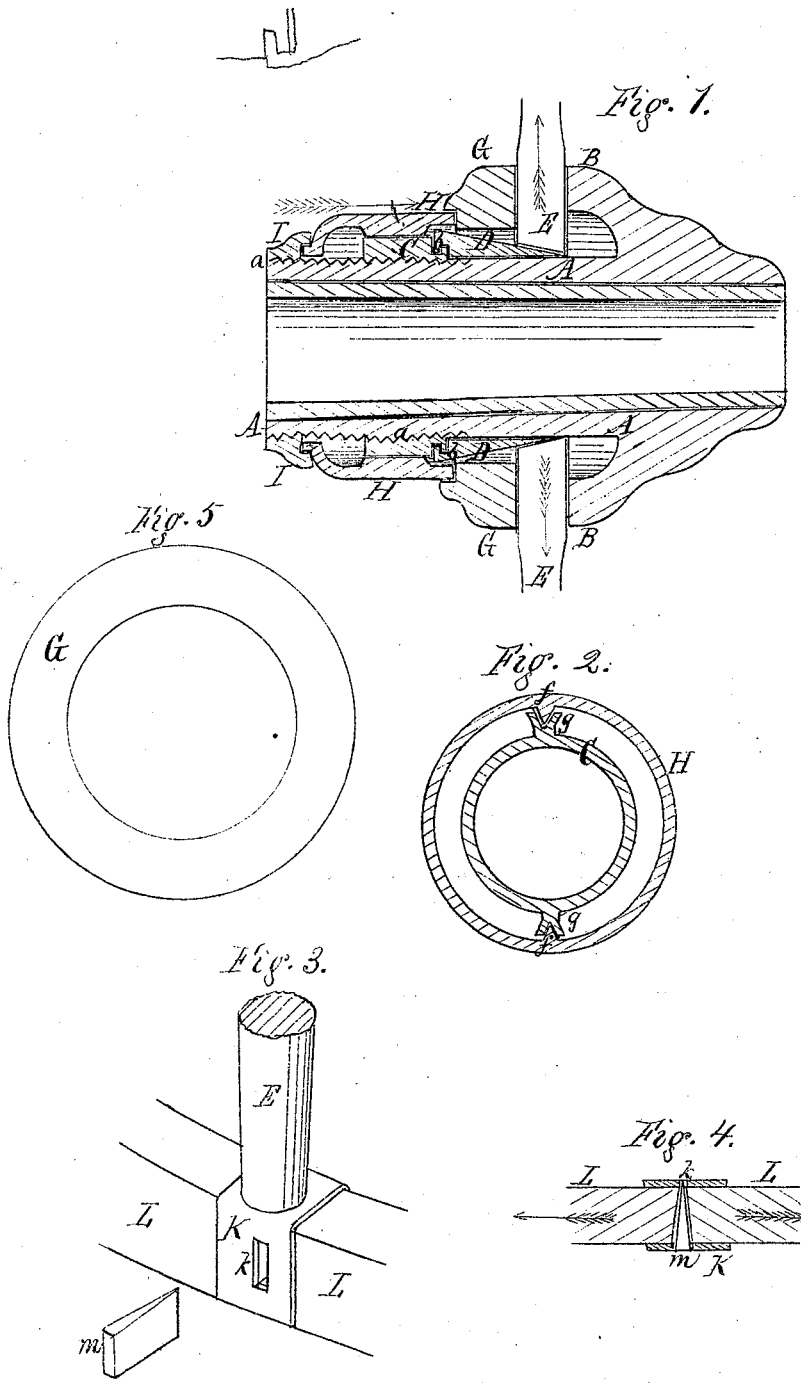

119,841

UNITED STATES PATENT OFFICE.

JOSEPH S. GRAVES, OF LIMA, NEW YORK, ASSIGNOR TO HIMSELF AND CHARLES W. HARMAN, OF SAME PLACE.

IMPROVEMENT IN CARRIAGE-WHEELS.

Specification forming part of Letters Patent No. 119,841, dated October 10, 1871.

*To all whom it may concern:*

Be it known that I, JOSEPH S. GRAVES, of Lima, in the county of Livingston and State of New York, have invented a certain new and useful Improvement in Carriage-Wheels, of which the following is a specification:

My invention consists in the construction of the hub, as hereinafter described, for expanding the spokes against the felly; also, in combination with the above, of a slotted plate at the joint of the felly for the insertion of a wedge to tighten the parts, as hereinafter described.

In the drawing, Figure 1 is a central longitudinal section of the hub; Fig. 2, a cross-section of the collar and wedge-nut in line $x\ x$, Fig. 1; Fig. 3, a perspective view of the slotted felly-plate and wedge; Fig. 4, a section of the same; Fig. 5, an elevation of the clamp that holds the spokes in place.

A represents the pipe-box. At one end it has a solid head, B, which forms one-half of the hub; at the other it has a screw-thread, $a$, on which rests a nut, $c$, which gives motion to the annular wedge D. This nut and wedge are connected by a joint, $b$, by which the nut is enabled to turn forward or backward on the thread without imparting a motion to the wedge; at the same time it carries the wedge forward or backward bodily as it is turned. This wedge enters under the ends of the spokes E E and pushes them out against the felly as it is forced in. This wedge is kept from turning by a feather or any other suitable arrangement. G is a loose clamp-ring, which fits against the sides of the spokes and holds them up to the solid head B, and thus retains them in their sockets. H is a collar which rests against the clamp-ring, and I is a head-nut, which forces the collar up to place as it screws upon the end of the hub. The whole, when placed together, forms the complete outline of a well-formed hub. A connection is made between the collar H and wedge-nut C by means of longitudinal tongues and grooves $f\ g$, as shown in Fig 2.

The operation is as follows: The spokes being inserted properly in their sockets in head B, the clamp-ring G is pressed firmly up to place by turning up nut I against collar H. This makes a complete connection from end to end, and makes the hub as solid and strong as the ordinary hub. If at any time the spokes become loose in the felly the clamp-nut I is turned back slightly to release the collar, when the latter can be turned, thereby giving motion to the nut C and wedge D through the medium of tongues and grooves $f\ g$. The wedge can, therefore, be made to press under the ends of the spokes to force them out by simply turning the collar. When the proper degree of expansion is attained the nut C is again clamped against the collar H by nut I, thus making the whole tight again. The wedge D retains its position under the spokes at any adjustment. This is an exceedingly simple and effective arrangement, as it enables the wedge to be tightened up without removing any of the parts of the hub, the only requisite being to loosen the end nut I slightly and then turn the collar H. The length of the connecting-tongues and grooves $f\ g$ is such as to allow the necessary movement forward or backward of the wedge-nut while this action is being performed. This forms one feature of novelty in my invention. Another feature is the wedge having the joint connection $b$ with the nut, by which the former moves only forward or backward while the latter turns free. This is essential in producing a perfect action. Another feature is the loose clamp-ring G, collar H, and nut I, making a clamp-connection clear to the outside, by which the whole is fastened by a single turn of the nut. The whole forms a new arrangement of parts for expanding the spokes in the felly. At the joint of the felly or rim L I place a plate or clasp, K, which embraces the ends and holds them in place. The upper end of this plate is formed with a socket, which holds one of the spokes. The sides of this plate has a slot, $k$, which coincides with the joint between the ends of the felly. In this slot fits a wedge, $m$. The plate provided with this slot has a special relation to the arrangement before described for expanding the spokes. As this expansion takes place the ends of the felly separate slightly, and it is necessary to fill up the slack or space of the joint to prevent loose action and rattling. The wedge does this perfectly.

I am aware that clasps are common in wheel-rims, and such, in the abstract, I disclaim. The novelty in my case consists in combining with the clasp the slot and wedge, by which the joint of the rim is filled.

What I claim, and desire to secure by Letters Patent, is—

1. The annular wedge D, jointed nut C, loose collar H, and head-nut I, arranged and combined, as herein described, for the purpose of expanding the spokes against the felly.

2. The loose collar H, screw-nut I, and collar G in combination with the solid head B of the pipe-box A having the screw-thread $a$ upon its periphery, substantially as described.

3. The combination, with the nut C and loose collar H, of the longitudinal tongues and grooves $f\ g$, as herein shown and described, and for the purpose specified.

4. The wedge D arranged upon the pipe-box A for forcing outward the spokes, in combination with the clasp K formed with a slot to receive a wedge for expanding the felly, substantially as and for the purpose set forth.

In witness whereof I have hereunto signed my name in the presence of two subscribing witnesses.

JOSEPH S. GRAVES.

Witnesses:
   FRED. A. HATCH,
   ARCHD. BAINE. (31)